United States Patent
Hoffmann

(10) Patent No.: US 9,394,450 B2
(45) Date of Patent: Jul. 19, 2016

(54) SEALING MASS FOR SEALING A LEAK IN A CONTAINER HOLDING OIL, AN OIL-CONTAINING OR CHEMICAL LIQUID

(71) Applicant: Gerd Hoffmann, Bad Iburg (DE)

(72) Inventor: Gerd Hoffmann, Bad Iburg (DE)

( * ) Notice: Subject to any disclaimer, the term of this patent is extended or adjusted under 35 U.S.C. 154(b) by 163 days.

(21) Appl. No.: 14/192,334

(22) Filed: Feb. 27, 2014

(65) Prior Publication Data

US 2014/0238270 A1    Aug. 28, 2014

(30) Foreign Application Priority Data

Feb. 28, 2013   (DE) .................... 10 2013 101 993

(51) Int. Cl.
  *C09K 3/12*    (2006.01)
  *C09D 7/12*    (2006.01)
  *C09D 101/26*  (2006.01)
  *C09D 133/20*  (2006.01)
  *C09J 9/00*    (2006.01)

(52) U.S. Cl.
  CPC ............ *C09D 7/1233* (2013.01); *C09D 101/26* (2013.01); *C09D 133/20* (2013.01); *C09J 9/00* (2013.01)

(58) Field of Classification Search
  None
  See application file for complete search history.

(56) References Cited

U.S. PATENT DOCUMENTS

| | | | | |
|---|---|---|---|---|
| 3,553,125 | A * | 1/1971 | Watters et al. ........... | C08K 5/01 524/313 |
| 4,025,672 | A * | 5/1977 | Hossenfelder ....... | C09D 113/02 427/366 |
| 5,639,525 | A * | 6/1997 | Kuhn ................. | B65D 51/1661 428/158 |
| 6,800,682 | B1 * | 10/2004 | Windhoevel ............ | C08L 25/08 524/366 |
| 7,645,829 | B2 * | 1/2010 | Tse ........................ | C09D 123/10 524/515 |
| 8,075,862 | B2 * | 12/2011 | Meyer ................... | C09C 1/3018 423/335 |
| 9,034,944 | B2 * | 5/2015 | Krieger ................ | C08K 5/5419 523/122 |
| 9,068,148 | B2 * | 6/2015 | Tamareselvy ............. | C08F 2/00 |
| 2006/0182703 | A1 * | 8/2006 | Arisz ....................... | A61K 8/731 424/70.13 |
| 2007/0219299 | A1 * | 9/2007 | Okamoto ............. | C08G 65/336 524/301 |
| 2007/0287820 | A1 * | 12/2007 | Weirich ............... | A61K 8/8117 528/1 |
| 2008/0255276 | A1 * | 10/2008 | Jetzinger .................... | C08J 3/24 524/35 |
| 2009/0304961 | A1 * | 12/2009 | Taguchi .................. | C08L 83/04 428/35.7 |
| 2012/0225983 | A1 * | 9/2012 | Wagner .................... | C09J 11/06 524/296 |
| 2015/0027634 | A1 * | 1/2015 | Kohl .................... | B32B 37/1207 156/329 |

FOREIGN PATENT DOCUMENTS

| | | | |
|---|---|---|---|
| DE | 2755636 | A1 | 4/1979 |
| GB | 1537953 | | 1/1979 |
| JP | 57055980 | * | 4/1982 |
| WO | WO2011/054782 | A1 | 5/2011 |

OTHER PUBLICATIONS

Anonym: "Hylomar L, M & H", Hylomar, Mar. 25, 2010.
European Search Report issued by the European Patent Office in European Application No. EP 14 15 6537 on May 27, 2014.
English translation of European Search Report issued by the European Patent Office in European Application No. EP 14 15 6537 on May 27, 2014.

* cited by examiner

*Primary Examiner* — Melvin C Mayes
*Assistant Examiner* — Colette Nguyen
(74) *Attorney, Agent, or Firm* — Henry M. Feiereisen LLC

(57) ABSTRACT

A plastically deformable sealing mass for the use in sealing a leak in a container in which oil, oil-containing or chemical liquid is stored, includes a solvent, and a hydrophobing agent which is received in the solvent. The solvent may be organic solvent, water, oil, or a silicon compound. The hydrophobing agent can be stearate, oleate, silane, siloxane, or silicon.

14 Claims, No Drawings

United States Patent US 9,394,450 B2

SEALING MASS FOR SEALING A LEAK IN A CONTAINER HOLDING OIL, AN OIL-CONTAINING OR CHEMICAL LIQUID

CROSS-REFERENCES TO RELATED APPLICATIONS

This application claims the priority of German Patent Application, Serial No. 10 2013 101 993.5, filed Feb. 28, 2013, pursuant to 35 U.S.C. 119(a)-(d), the disclosure of which is incorporated herein by reference in its entirety as if fully set forth herein.

BACKGROUND OF THE INVENTION

The present invention relates to a sealing mass for sealing a leak in a container holding oil, an oil-containing or chemical liquid.

The following discussion of related art is provided to assist the reader in understanding the advantages of the invention, and is not to be construed as an admission that this related art is prior art to this invention.

Transport and storage of containers filled with oil, oil-containing or chemical liquids, in particular drums, canisters or comparable barrels, pose a potential risk when improper handling causes damage in form of leaks. Escaping liquid may then lead to significant environmental harm, in particular soil pollution, which can then be remedied only at great expenditure. Leaks of a container which holds chemical liquids for example can be sealed by using a plastically deformable sealing mass on mineral basis which is easy to apply and able to conform to the container geometry and other locally changing conditions. A mineral sealing mass is, however, inadequate when leaks in containers are involved that carry oil or oil-containing liquids. One reason is the intense separation effect of oil that prevents adherence of such sealing materials.

Another approach involves the use of inflatable membranes, soft sleeves and sealing pads as seal in combination with further fastening elements. Practice has shown, however, that this type of leak-proof seal is inadequate and does not meet the required demands, especially also because they are difficult to handle and preclude a necessary rapid sealing of the leak.

It would therefore be desirable and advantageous to provide an improved sealing mass to obviate prior art shortcomings and to improve a sealing effect with respect to oil or oil-containing liquids,

SUMMARY OF THE INVENTION

According to one aspect of the present invention, a plastically deformable sealing mass for the use in sealing a leak in a container in which oil, oil-containing or chemical liquid is stored, includes a solvent; and a hydrophobing agent received in the solvent.

As has been shown surprisingly, a sealing mass according to the present invention provides a substantial improvement with respect to maintaining adherence, especially also handling capability. Such a sealing mass is able to provide an initial seal that can last six hours and prevents escape of oil or oil-containing liquid. This time period is sufficiently long to allow emptying of a container, i.e. transfer of the liquid and to allow a permanent sealing of the leak, if need be. The use of such a sealing mass has also been proven as especially suitable for containers containing ammonium hydroxide (ammonia), sodium hydroxide and further lyes.

According to another advantageous feature of the present invention, the solvent can be an organic solvent, water, oil, e.g. white oil, or a silicon compound, e.g. a silicon oil, siloxane or alkyl trialcoxy silane.

According to another advantageous feature of the present invention, the sealing mass may include in mass-%:

| | |
|---|---|
| stearate | 40.0-50.0% |
| organic solvent/white oil | 10.0-20.0% |
| water | 30.0-40.0% |
| cellulose ether | 1.0-5.0% | and at least one regulating agent and/or fibers.

Main components as hydrophobing agent of the sealing mass are stearates, e.g. Zn-, Ca-, Mg-, Al-, Na-stearates or other hydrophobic agents such as oleates (Na-oleate) or organic silicon compounds (silanes, siloxanes or silicone oil), alone or in combination with one another. This representation constitutes merely an exemplary selection.

In order to maintain readiness of the normally powdery hydrophobing agent as plastically deformable, i.e. pasty, sealing mass, the latter contains in accordance with the invention a solvent which may include water and/or an organic liquid, such as, for example, butyl glycol, white oil, or organic silicon compounds such as silicone oil, siloxane, or alkyl trialcoxy silane.

According to another advantageous feature of the present invention, an adhesive can be admixed to the sealing mass. Examples of an adhesive include cellulose ether or acrylate.

Thus, a sealing mass according to the invention can include as main components:

Hydrophobing agent
Solvent (water and/or an organic solvent and/or oil, e.g. white oil, and/or organic silicon compounds)
Adhesive According to another advantageous feature of the present invention, fibers and/or a regulating agent can be added to the sealing mass for adjusting a consistency of the sealing mass. For example, the desired consistency can be adjusted by adding to the basic mixture of the sealing mass additional regulating agents, e.g. dispersed silicic acid and/or fibers (for example 6 mm polyacrylnitrile) so as to realize adequate consistency with a penetration depth of e.g. 10-14 mm on one hand, and adequate compressive strength and stability of the sealing mass. The consistency of the mixture can be changed in dependence on the mixing process and introduced mixing energy.

According to another advantageous feature of the present invention, the sealing mass may be provided as a one-component formulation with exemplified constituents in mass-%

| | |
|---|---|
| Zn-stearate | 40.0-60.0, preferably 50.0 |
| organic solvent/white oil | 10.0-20.0, preferably 16.0 |
| water | 30.0-40.0, preferably 31.7 |
| cellulose ether | 1.0-5.0, preferably 2.3 |

According to another advantageous feature of the present invention, the sealing mass can be formulated as a two-component sealing mass having an adhesion promoter comprised of stearate, surfactant, organic solvents, water and cellulose ether, in combination with the afore-stated basic formulation.

By way of example, the first component, i.e. the adhesion promoter, may include the following constituents, with the proportional share expressed in mass-%.

| | |
|---|---|
| Zn-stearate | 11.0 |
| Surfactants | 34.4 |
| organic solvent/white oil | 6.0 |
| water | 47.0 |
| cellulose ether | 1.6 |

This mixture is also adjusted with the assistance of a regulating agent, for example with the mentioned dispersed silicic acid, to a viscosity of 1,000-3,000. Currently preferred is an viscosity adjustment to 1,500 to 2,500 mPa-s (millipascal seconds), which is about the viscosity of a common house paint.

The second component having greater stability than the one-component mixture may then be made from the same parts since this mixture is also provided with the final consistency by using regulating agents and/or fibers: In this case, a consistency of only 6-10 mm penetration depth is strived at.

Compared to the one-component variant, the two-component variant of the sealing mass has the advantage of decoupling technical tasks. The first component (adhesion promoter) significantly reduces hereby the separation effect of oil accompanied by a quite remarkable improvement of the adhesion capability of the sealing mass. The second component provides increased stability with respect to the escaping medium, a fact that is especially of great advantage when larger leaks covering an area of more than 100 $mm^2$ is involved.

A feasible handling of the two-component sealing mass may involve a leak-proof seal as multilayered patch, with the second component being applied upon a substrate that is suited to the size of the leak, and being evenly coated with the first component. The leak is sealed by evenly pressing this patch into the leak so that escaping liquid is prevented from overflowing this patch.

According to another advantageous feature of the present invention, a bandage can be provided instead of a single patch, and can be optionally cut to size and peeled away from a backing.

When larger leaks are involved, for example covering more than 100 $mm^2$, formed parts, for example wedges, pins, posts or the like, may be used with a binding agent on the basis of one of the afore-stated formulations. Embedded in these formed parts are fibers of glass, plastic, hemp or the like or in the form of film strips, as stretch film, for further increase of the stability. The formed part is pressed as anchor into the leak and additionally secured by a pin which is forced in in midsection.

As an alternative, the securement may also be realized by a fabric sack which surrounds the formed part and is pulled after being pushed into the leak while the inside sealing mass is fixed under pressure at the same time. This results on the inside of the container in a stabilizing bead which provides additional support

BRIEF DESCRIPTION OF THE DRAWING

NONE

DETAILED DESCRIPTION

The improvement of the state of the art by the invention will become apparent with reference to the following illustrated test results.

The table shows hereby failure loads obtained during an adhesive pull-of test upon high density polyethylene (HDPE), with a mineral sealing mass (MS) according to the state of the art and a sealing mass with stearate (SS) according to the invention being used.

Pretests have determined a demanded adhesive pull-off force at a leakage size of 50 $mm^2$: P>10 N.

The sample volume amounted to 8 gram each time and a tensile die area of 11.35 $cm^2$. 1.5 g of technical white oil (Woil) was used as oil. The tests have been carried out without adhesion promoter (AP) and with adhesion promoter.
Obtained Adhesive Pull-Off Force P (N)

| | | MS | SS |
|---|---|---|---|
| 1.1. | Surface with Woil, without AP | 3.5 | 6.0 (+71%) |
| 1.2 | Surface with Woil and AP | 6.5 | 15.0 (+131%) |

When the surface is wetted with white oil, a sealing has been obtained with values less than the required 10 N in both sealing masses without adhesion promoter (AP) (line 1.1). Only when the adhesion promoter AP (line 1.2) has been used, the sealing mass SS upon HDPE reached the desired adhesion, This has been confirmed by a further test with a standpipe provided in the base region with a vertical slot. The pressure level of the liquid column was at 90 cm. The standpipe was filled with technical white oil and emptied after opening the slot to a pressure level of about 60 cm. The sample volume of sealing mass was 10 g in each case, applied upon a substrate. The sample volume of AP was 3 g.

| | Stability of the Sealing | Remark |
|---|---|---|
| MS | 0.0 hours | no sealing possible |
| MS + AP | 1.2 hours | with firm contact pressing of the sealing mass |
| SS | more than 6.0 hours | with firm contact pressing of the sealing mass |
| SS + AP | more than 6.0 hours | with moderate contact pressing of the sealing mass |

Even when the sealing SS without adhesion promoter is stable for more than 6 hours, to provide increased assurance and in the presence of larger leakage points, the use of the adhesion promoter AP is recommended, with the contact pressure being significantly reduced during sealing with AP.

In a hydraulic test stand with water as medium, seals with SS and with SS+AP are carried out, with the leak covering an area of 50 $mm^2$. The maximum pressure reached within 15 minutes after sealing was in all cases above 0.3 bar, i.e., significantly above an attainable static pressure, for example in a truck tank, which through calculation amounts at a pressure level of about 0.6 m to only 0.05 bar.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A plastically deformable sealing mass for the use in sealing a leak in a container in which oil, oil-containing or chemical liquid is stored, said sealing mass comprising in mass %:
   stearate as a hydrophobing agent 40.0-50.0%
   an organic solvent 10.0-20.0%
   water 30.0-40.0%
   cellulose ether 1.0-5.0%
   and at least one regulating agent and/or fibers.

2. The sealing mass of claim 1, wherein the organic solvent is made of a member selected from the group consisting of white oil, and organic silicon compound.

3. The sealing mass of claim 2, wherein the organic silicon compound is silicon oil, siloxane or alkyl trialcoxy silane.

4. The sealing mass of claim 1, wherein the fibers are polyacrylnitrile and the regulating agent is silicic acid.

5. The sealing mass of claim 1, having 50.0% of stearate.

6. The sealing mass of claim 1, having 16.0% of organic solvent.

7. The sealing mass of claim 1, having 31.7% of water.

8. The sealing mass of claim 1, having 2.3% of cellulose ether.

9. The sealing mass of claim 1, wherein the sealing mass is proportioned and stored in a sack.

10. The sealing mass of claim 9, wherein the sack is a fabric sack.

11. A plastically deformable sealing mass for the use in sealing a leak in a container in which oil, oil-containing or chemical liquid is stored, said sealing mass comprising:
   a solvent; and
   a hydrophobing agent received in the solvent,
   wherein the sealing mass is formulated as a two-component sealing mass having an adhesion promoter comprised of stearate, surfactant, organic solvents, water and cellulose ether, said adhesion promoter having a viscosity of 1,000-3,000 mPa-s.

12. The sealing mass of claim 11, wherein the viscosity of the adhesion promoter is 1,500-2,500 mPa-s.

13. The sealing mass of claim 11, further comprising a substrate to hold the sealing mass, said adhesion promoter constituting a first component of the two-component sealing mass and applied upon the sealing mass as second component with the substrate.

14. The sealing mass of claim 13, wherein the first and second components and the substrate jointly form the sealing mass in the form of a roll from which it can be cut to a desired length.

* * * * *